Figure 10:
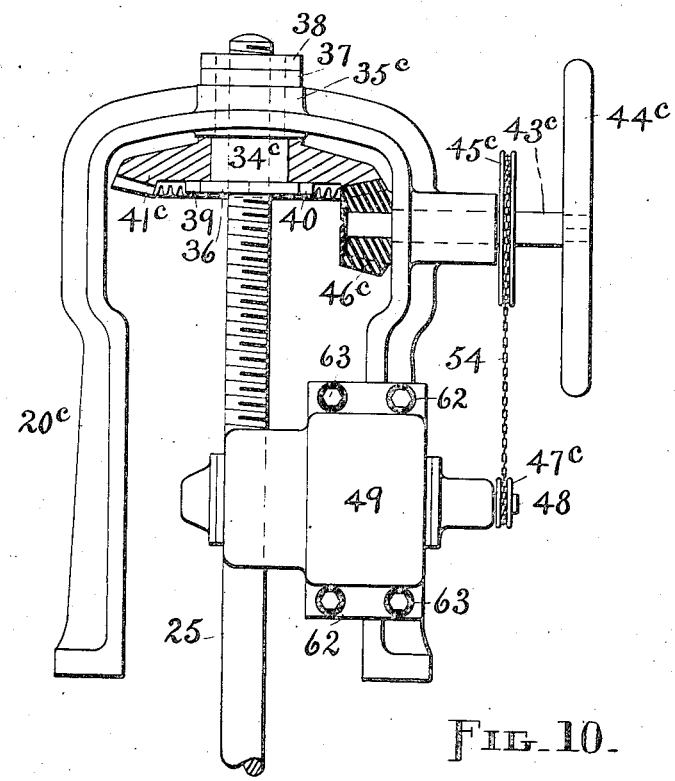

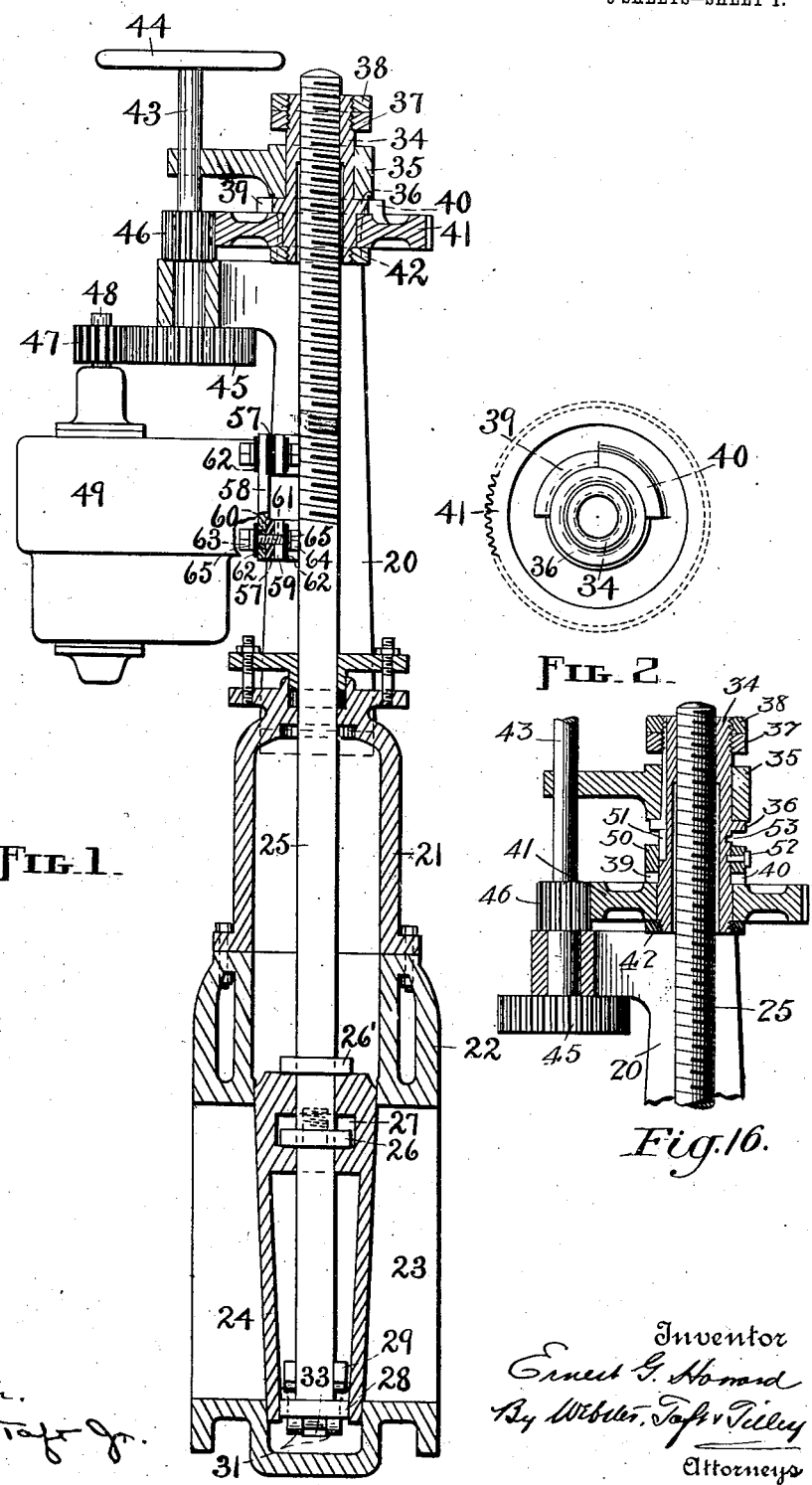

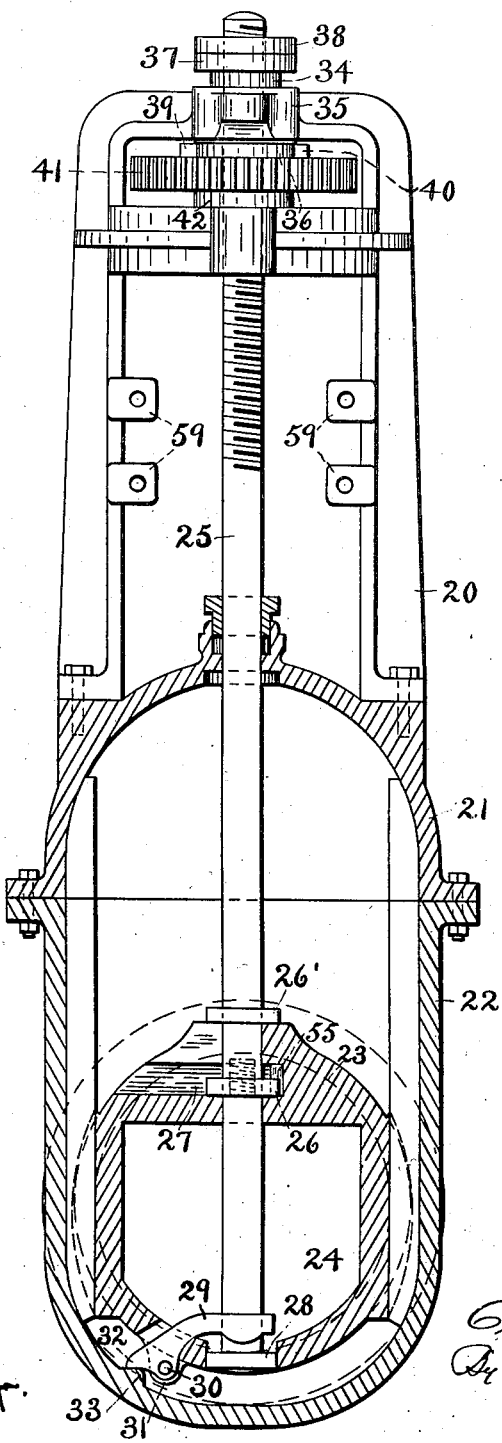

No. 863,180. PATENTED AUG. 13, 1907.
E. G. HOWARD.
MOTOR DRIVEN VALVE MECHANISM.
APPLICATION FILED MAR. 31, 1902.
5 SHEETS—SHEET 3.
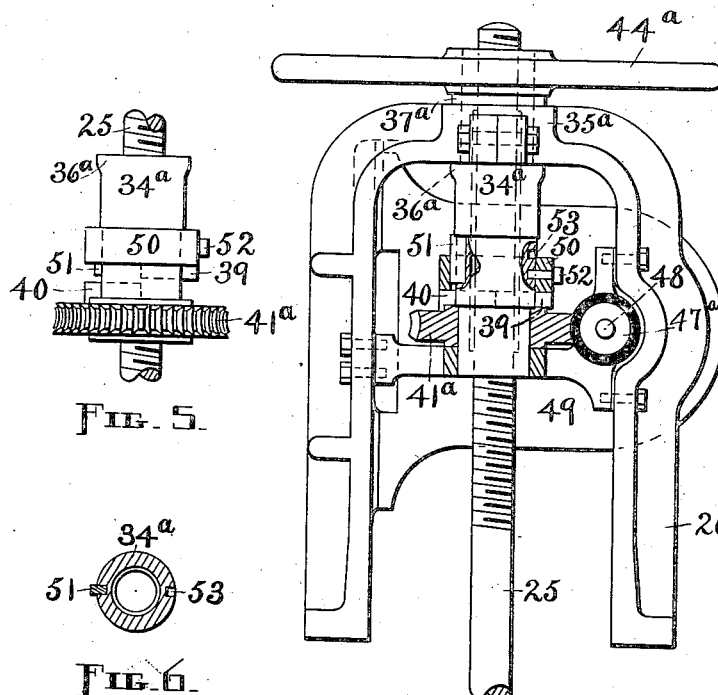
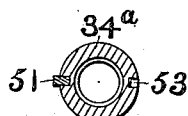
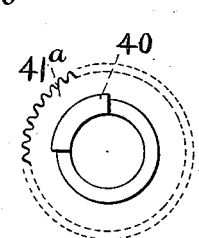
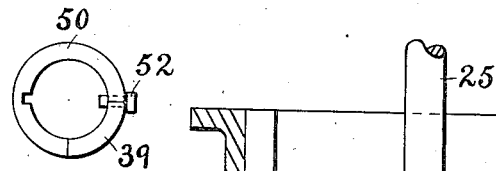
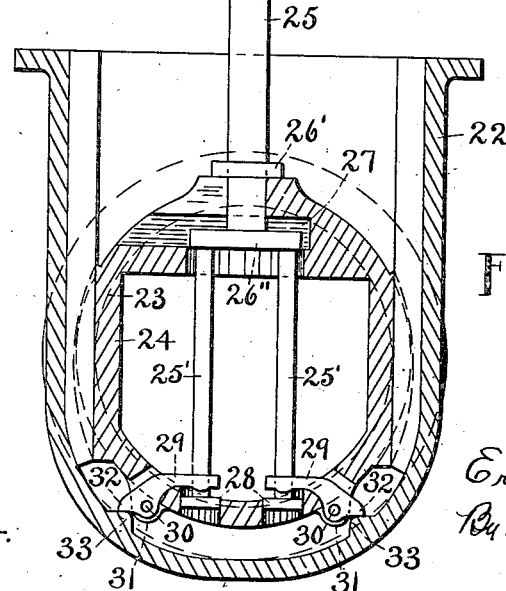
Witnesses
F. A. Cutter.
Stephen D. Taft Jr.
Inventor
Ernest G. Howard
By Webster Taft & Tilley
Attorneys No. 863,180.

PATENTED AUG. 13, 1907.

E. G. HOWARD.
MOTOR DRIVEN VALVE MECHANISM.
APPLICATION FILED MAR. 31, 1902.

5 SHEETS—SHEET 4.

Witnesses
F. A. Cutter.
Stephen S. Taft Jr.

Inventor
Ernest G. Howard
By Webster, Taft & Tilley
Attorneys

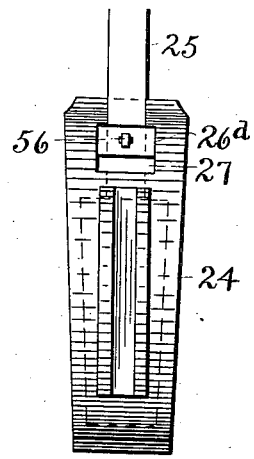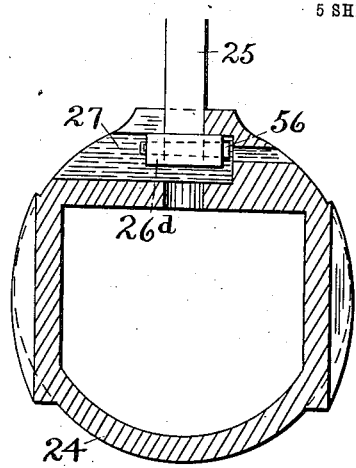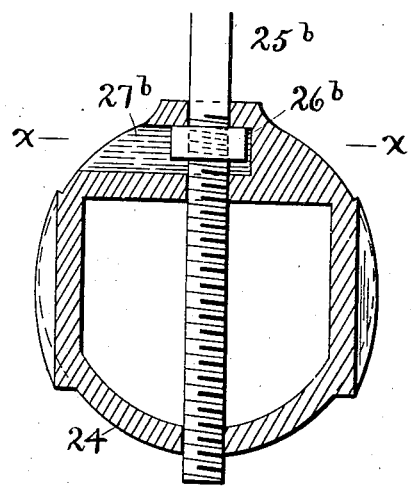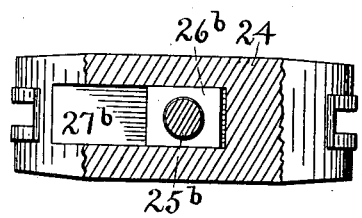

UNITED STATES PATENT OFFICE.

ERNEST G. HOWARD, OF SPRINGFIELD, MASSACHUSETTS, ASSIGNOR TO CHAPMAN VALVE MANUFACTURING COMPANY, OF SPRINGFIELD, MASSACHUSETTS, A CORPORATION OF MASSACHUSETTS.

MOTOR-DRIVEN VALVE MECHANISM.

No. 863,180.  Specification of Letters Patent.  Patented Aug. 13, 1907.

Application filed March 31, 1902. Serial No. 100,699.

*To all whom it may concern:*

Be it known that I, ERNEST G. HOWARD, a citizen of the United States, residing at Springfield, in the county of Hampden and Commonwealth of Massachusetts, have invented new and useful Motor-Driven Valve Mechanism, of which the following is a specification.

My invention relates to improvements in mechanism by which power is transmitted from a motor to the plug or gate of a valve, to open and close the same, in which one or more lost motion devices are introduced at convenient points; and the objects of my improvement are, first, to provide means whereby a comparatively small motor can be employed for actuating the gate; second, to furnish simple and effective means for this purpose; third, to effect a saving in expense of construction and operation; and, fourth, to afford such means applicable to any of the well-known forms of water, steam, or other valve construction having either an outside or inside screw.

Heretofore, in order to employ an electric motor for operating large valves, it has been necessary to resort to the use of one which was very much larger than would be required for simply actuating the gate after being started, owing to the increased amount of power required to start or release said gate. When the gate is actuated into either of its extreme positions, or reaches the limit of its travel in other words, it becomes wedged into place or binds and the screw by which said gate is operated also binds, and considerably more force is required to unlock said screw and start the gate than would be necessary in the absence of such frictional resistance, more in fact than is actually needed for the continuation of the balance of the opening or closing operation. My invention renders a small motor entirely adequate for the performance of all work required in the operation of valves, by providing a suitable lost motion device or devices between the motor and gate, whereby the motor is enabled to gather sufficient momentum to overcome the initial resistance.

I attain the above-mentioned objects by the mechanism illustrated in the accompanying drawings, in which—

Figure 11:
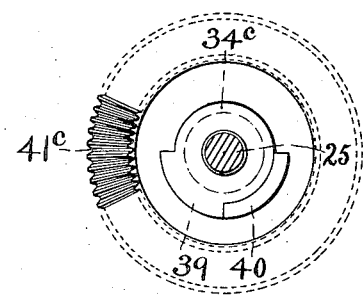

Figure 1, is a cross-section of a valve embodying my invention, and having a motor attached thereto; Fig. 2, a plan view of one of the lost motion devices shown in Fig. 1; Fig. 3, a side view and partial section of said valve, the motor and intermediate shaft mechanism being omitted; Fig. 4, a side view of the upper portion of a worm-gear valve mechanism embodying my invention, certain parts being in section and broken away; Fig. 5, a side view of the lost motion device shown in Fig. 4, showing the slip ring and gear disconnected; Fig. 6, a cross-section of the spindle nut shown in the two preceding figures; Fig. 7, a bottom view of the aforesaid slip ring; Fig. 8, a plan view of the worm-gear; Fig. 9, a sectional view of a body and gate showing a modified form of lift; Fig. 10, a side view of the upper portion of a valve mechanism with motor attached, showing the application of a lost motion device and bevel gears, also sprocket connections, the gears being in section; Fig. 11, a bottom view of the large bevel gear and spindle nut; Fig. 12, an edge view of a gate showing a lost motion device applied thereto; Fig. 13, a longitudinal section of the gate shown in Fig. 12; Fig. 14, a longitudinal section of a gate showing a lost motion device for an inside screw; Fig. 15, a horizontal section on lines x—x, Fig. 14; and Fig. 16, a sectional view of a modification showing the application of the slip ring to the Fig. 1 construction.

Valves are divided into two classes, one in which an outside screw is used and the other in which an inside screw is used. The outside screw construction comprises a spindle threaded at its upper or outer terminal to engage a revolving spindle nut, and the inside screw construction comprises a spindle threaded at its lower or inner terminal to engage the gate. In the first instance the spindle travels and carries the valve with it, and in the second instance the spindle has no longitudinal movement, but the gate moves up or down on the same. With the exception of Figs. 14 and 15, which are illustrations of the second class, the drawings illustrate the first class, hence it will be seen that my invention is applicable to either construction. Furthermore it is applicable to various kinds of gearing.

Broadly considered, my invention consists of a lost motion device introduced into the valve mechanism between the motor and the gate, and the essential features of said device are rotary members provided with clutch projections extending into each other's paths of travel, the combined arcs of said projections being less than a complete circle, or nuts adapted to reciprocate within predetermined bounds. Either the clutch projections or reciprocating nut, or both, may be employed in connection with outside or inside screw mechanism for valves.

Similar figures refer to similar parts throughout the several views.

Referring to Figs. 1 and 3, a yoke 20 is mounted on a cap 21 which in turn is mounted on a body 22. The passage 23 through the body 22 is shown closed by a gate 24. The gate 24 is guided by ribs or splines in the usual manner. A spindle 25 threaded at its upper terminal, extends through the center of the yoke 20 and cap 21 which is provided with a suitable stuffing-box and follower for said spindle, and the latter continues downward through the gate 24. Collars 26 26′ are integral with or fast on the spindle 25, the collar 26' being located above the top of the gate 24 while the collar 26 is received into a recess 27. The recess 27 is of greater height than the collar 26 contained therein. A collar 28 is located at the base of the spindle 25 or an extension thereof. A lift 29 is pivoted at 30 to lugs 31 on the bottom of the gate 24, and has a bifurcated terminal which embraces the spindle 25 above the collar 28, while an ear 32 extends from said lift to bear upon a projection 33 rising from the floor of the body 22.

The threaded terminal of the spindle 25 is engaged by an internally threaded nut 34 which fits loosely in the top of the yoke head 35 in which it is permitted to reciprocate within the limits fixed by an integral collar 36 below said head and a collar 37 screwed onto the top of said nut above the head and held in place by a second collar 38. A clutch projection 39 extends from and beyond the collar 36 into the path of a similar projection 40 rising from a large gear 41 below. A collar 42 is screwed onto the base of the nut 34 to hold the gear 41 in place, but said gear is adapted to turn freely on said nut.

An intermediate shaft 43 has its bearings in brackets extending from the yoke. A hand wheel 44 is mounted on the top of the shaft 43, a large gear 45 at the bottom, and a small gear 46 at an intermediate point, said gears being tight on said shaft. The gear 46 meshes with the gear 41 and is wide enough to permit the latter to move up and down with the nut 34 and at the same time remain in mesh with said gear 46. The gear 45 meshes with a small gear 47 on the shaft 48 of a motor 49 which is securely bolted to the yoke.

The clutch projections 39 and 40 are represented as one quarter segment each, as are those shown in other views, but it will be understood that these dimensions may be varied so long as their united arcs do not form a complete circle in which event no lost motion would be possible, of course. The smaller the arcs the greater will be the amount of lost motion and the greater the number of revolutions of the motor before it does any material work, as will be presently explained.

When the gate 24 is closed, the mechanism hereinbefore described operates as follows to open the same. The motor 49 is set in motion and causes the gear 41 to revolve through the medium of the gears 47, 45 and 46, and said gear 41 turns freely on the spindle nut 34 until the front end of the projection 40 encounters the front end of the projection 39 when said nut begins to rotate. This is the first lost motion and, if the gear 47 revolves twelve times as fast as the gear 41 for example, and each clutch projection is a quadrant, the motor makes six revolutions before the nut 34 begins to turn provided the rear ends of the clutch projections were in conjunction at the start as would ordinarily be the case. The nut 34 now travels down the spindle 25 until the collar 37 comes in contact with the top of the head 35. This is a second lost motion since the spindle 25 is not affected until the above-mentioned contact occurs. Assuming that the spindle 25 is provided with a two-pitch thread and the nut 34 turns once around before the collar 37 and head 35 contact, the motor must have made eighteen revolutions up to this time. Owing to the extra width of the gear 46 the gear 41 is always in mesh with the same, as hereinbefore stated. The revolving nut 34 next begins to perform its work of elevating the spindle 25 which does not directly affect the gate 24, however, until the collar 26 comes in contact with the top of the recess 27 and, if it requires say one revolution of the nut 34 to raise the spindle 25 sufficiently for said collars 26 to strike the top of said recess, the motor will have made thirty revolutions before it begins to actually lift the gate. In this manner the motor gathers sufficient momentum to first unlock the nut 34 from the spindle, for it will be remembered that the collar 36 was jammed tight against the bottom of the head 35 before said nut was turned, and second to overcome the resistance offered by frictional contact between the gate and its seat thereby starting the former. A third lost motion is therefore provided for by the recess 27 as explained. Ordinarily provision for one or at most two lost motions in a single valve, is all that is required, although three devices for this purpose have been set forth for the sake of illustration; it will, therefore, be understood that any one or two of those shown may be omitted. The motor continues to revolve and the gate 24 is raised by the spindle 25 until the former strikes the top of the cap 21 which prevents further movement in this direction and causes the motor to stop. The gate is now open and the nut 34 binds hard on the spindle.

To close the gate, reverse the motor to actuate the rotary and reciprocating members in the opposite directions to those previously described. In this case the gear 41 turns freely until the rear end of the clutch projection 40 encounters the rear end of the projection 39; then the nut 34 is unlocked and travels up on the spindle until the collar 36 again bears against the yoke head; next the spindle descends until the collar 26 strikes the bottom of the recess 27; and finally the gate is lowered and wedged into place at the bottom of the body 22 and the motor stops.

The lift 29 is useful for valves subjected to great pressure, as water, on one side, and operates as follows:— When the spindle 25 begins to rise the collar 28 encounters the bifurcated end of the lift and said lift pries the gate out of its wedged position, assisting the same to start on its upward travel, through the medium of the ear 32 which bears on the projection 33. No work is done by the lift in closing the gate.

Two lifts 29 may be employed, as shown in Fig. 9, the same being operated by means of spindle extensions 25' 25' depending from the collar or cross-box 26'' on the end of the spindle 25, each extension having a collar 28 on its lower end. This construction provides against lateral strain or bind.

The hand wheel 44 is used to open or close the gate when for any reason it is not possible or desirable to employ the motor, and may also serve in the capacity of a balance-wheel for the mechanism; the same is true of the hand wheels shown in the other forms of construction. The wheel 44 may be turned freely until the lost motions are taken up, when it operates in the usual manner.

In Fig. 4 I show a yoke 20$^a$ slightly changed in construction from the yoke 20, and dispense with intermediate shaft and gears and the reciprocating spindle nut. A non-reciprocating spindle nut 34$^a$ is here used and held against longitudinal movement by a shoulder or collar 36$^a$ below and a collar 37$^a$ above the head 35$^a$, said collars bearing against said head. A worm gear 41ª instead of a spur gear, is loose on the nut 34ª, and meshes with a worm 47ª on the motor shaft 48. The gear 41ª has a clutch projection 40. A slip ring 50 provided with a clutch projection 39 normally extending into the path of the gear projection, is held to the nut 34ª above the gear 41ª by means of a key 51 and a pin 52 which latter passes through said ring and registers with an opening in said nut. A second opening 53 is made in the nut 34ª above the first. A hand wheel 44ª is mounted on the upper end of the spindle nut.

When the parts occupy the positions shown in Fig. 4, the gear 41ª makes a half turn before unlocking the nut 34ª and causing the spindle 25 to rise. Assuming that the worm and gear are as fifty to one for example, the former must make twenty-five revolutions before the motor begins to do any actual work and, if one of the lost motion devices be employed at the gate end of the spindle, more revolutions of said motor are required to commence the operation of raising the gate. By reversing the motor the mechanism is actuated to close the gate as before.

In order to operate the spindle by hand, disengage the pin 52 from the nut opening, raise the ring 50 until its projection 39 clears the plane of the projection 40, and insert the end of said pin in the opening 53. The spindle can now be operated by the hand wheel through the spindle nut, without disturbing the gear connections, since said nut turns freely in the worm gear.

In Fig. 16, I show a method whereby the slip ring previously described, can be applied to the reciprocating spindle nut of the Fig. 1 construction. Here the clutch projection 39 is on the ring 50 instead of being on the nut 34 which latter is lengthened sufficiently to receive said ring and allow for whatever movement is required to disengage the clutch projections 39 and 40. The construction, arrangement and operation of the several members in this view, are similar to what has been hereinbefore fully described.

The lost motion device shown in Figs. 14 and 15 may be used in connection with the inside screw construction. This device consists of a nut 26ᵇ located in a recess 27ᵇ in the gate 24. The spindle 25ᵇ passes through the nut 26ᵇ which is threaded to receive the threaded terminal of said spindle. Since the proportions and size of the nut 26ᵇ permit the same to move up and down in the recess 27ᵇ, but do not allow it to turn in said recess, it will be readily seen that, in closing the gate, said nut is actuated downward by the spindle until the bottom of the recess is encountered, before said gate is affected, after which the latter begins to move. And just the reverse is true when the opening operation takes place.

In Fig. 10 a yoke 20ᶜ supports the motor and a spindle 25 which is operated by a nut 34ᶜ. A bevel gear 41ᶜ is loose on the nut 34ᶜ between the nut collar 36 and the yoke head 35ᶜ. Vertical movement of the nut 34ᶜ is prevented by collars 37 and 38 screwed onto the same above the head 35ᶜ. The collar 36 has a clutch projection 39 adapted to be engaged by the projection 40 on the underside of the gear 41ᶜ. The gear 41ᶜ meshes with a small bevel gear 46ᶜ tight on the intermediate shaft 43ᶜ which is placed horizontally in this case and driven by a chain 54 connecting a large sprocket wheel 45ᶜ on said shaft with a small sprocket wheel 47ᶜ on the motor shaft 48. The operation of this mechanism does not differ materially from what has already been fully described. A hand wheel 44ᶜ is placed on the outer end of the shaft 43ᶜ for operating the spindle 25 when the motor is not in use.

In connection with the collar 26 shown in Figs. 1 and 3, it should be stated that a spline 55 in the recess 27, engages the collar 26 and prevents the latter with the spindle 25 from rotating. As shown in these figures, the collar 26′ merely assists the collar 26 in closing the gate and may be omitted, or this work can be performed entirely by said collar 26′ if it is desired to cut down the bottom of the recess 27.

In place of the collar or member 26, shown in Fig. 1, a block or member 26ᵈ may be used, as shown in Figs. 12 and 13. The block 26ᵈ is secured to the base of the spindle 25 by a pin 56 and is prevented from turning in the recess 27 by reason of its shape. This construction dispenses with the spline 55.

Although other than electric motors may be employed with my invention, the electric motor is preferred and when used must be insulated from the valve. The insulation is provided for in the manner described below. In Fig. 1, plates 57 of insulating material are inserted between each foot 58 of the motor and the yoke lugs 59, a bushing 60 of insulating material is inserted in each motor foot hole for the bolt 61, and washers 62 62 of like material are introduced between each bolt head 63 and nut 64, metallic washers 65 65 being inserted between said washers 62 and said head and nut. The motor pinions or small gears 47, the worm 47ª, and the sprocket wheel 47ᶜ, are, in this case, made of raw-hide or other suitable insulating material. The above is the preferred form of insulation, but other suitable means may be employed.

From the foregoing it will be readily understood that numerous changes and combinations can be made without violating the spirit of my invention, and I desire to include and cover all modifications which fall within the scope of said invention.

The general construction comprising a gate, motor, spindle, driving mechanism and a lost motion therein, a hand wheel or balance wheel, and means to adjust the lost motion so as to disconnect the motor and leave the spindle to the control of the hand wheel; and a specific construction which is limited to an intermediate shaft having a slip ring connected therewith, are not abandoned by reason of such constructions being shown, or being adapted to be read into the case, but not specifically claimed herein, as the same form the subject matter of claims in a divisional co-pending application filed by this applicant, the same being Serial Number 123,955, filed September 18, 1902. And the general and specific constructions including a motor, spindle and driving mechanism between a disconnecting clutch introduced into such mechanism, and a hand wheel remote from the clutch, for operating the spindle when disconnected from the motor; the same except that the clutch is limited by comprising an axially movable part; a motor and pinion, a spindle and operating gear, an intermediate shaft and gears, a clutch comprising one of the intermediate gears and a collar on said shaft, one of the clutch members being adapted to move longitudinally into and out of engagement with the other, and a hand wheel for operating the spindle when the clutch members are disconnected; the essential elements already noted with the addition of manual means for separating the clutch members; and a motor, spindle, driving mechanism between the two, an intermediate shaft, and a clutch comprising a loose gear and tight collar on the shaft and normally engaging clutch projections between the gear and collar, are not abandoned by reason of such constructions being shown, or being adapted to be read into the case, but not specifically claimed herein, as the same form the subject matter of claims in a co-pending application filed by this applicant, Serial Number 139,856, filed January 20, 1903.

What I claim as my invention, and desire to secure by Letters Patent, is:—

1. The combination with a recessed valve gate and spindle therefor and a motor to actuate the spindle, of a rotary reciprocating nut on said spindle, a gear rotatably mounted on said nut, meshing with the motor gearing, clutch projections on the nut and gear in each others paths of travel, a collar or member on the spindle in the gate recess of less height than the latter, and means to hold the collar or member against rotary motion.

2. The combination with a motor, of a spindle, driving mechanism between said motor and spindle comprising rotary members provided with clutch projections extending into each others paths of travel, a recessed gate, a nut or member on the spindle in the gate recess, said nut being of less height than said recess, and means to hold the nut against rotary motion in the recess.

3. In combination with a spindle and a reciprocating nut adapted to actuate the same, means to limit the longitudinal movement of said nut, a recessed gate, a collar or member on said spindle in the gate recess, said collar or member being of less height than said recess, and means to hold the collar or member against rotary motion in the recess.

4. The combination with a motor, of a spindle, driving mechanism between said motor and spindle comprising a rotary member provided with a clutch projection, a reciprocating spindle nut having a clutch projection extending into the path of the first-mentioned projection, means to limit the longitudinal movement of said collar or member, a recessed gate, a nut on the spindle in the gate recess, said collar or member being of less height than said recess, and means to hold the collar or member against rotary motion in the recess.

5. In combination with a motor-driven spindle, a gate, a suitable body for the latter, means to permit said spindle to move for a limited distance without said gate, and a lift interposed between the gate and said body and adapted to be actuated by the upward independent movement of the spindle and to start the gate from its seat.

6. In combination with a motor, a valve spindle, a reciprocating spindle nut, a gear loose on said nut, an intermediate shaft, a gear on said shaft meshing with the nut gear and wider than the same, gearing between the motor and the wide gear, and clutch projections on the nut and its gear, extending into each others paths of travel, substantially as set forth.

7. In combination with a valve spindle, a spindle nut, a motor-driven gear loose on said nut and provided with a clutch projection, a ring keyed to the nut, having a clutch projection extending into the path of the first mentioned projection, and means to release said ring and retain it in a position where its projection is out of the plane of the gear projection.

8. The combination with a valve and valve-stem, of continuously-moving automatic mechanism for raising the valve-stem, and a connection between the valve and its stem by which the initial movement of the stem in the valve is free, whereby the motor may have a free start and the stem strikes the valve a blow in order to start it.

9. The combination with a gate-valve and electrically-operated mechanism for opening the same, of a valve-stem attached to the valve so as to have lost motion and strike the valve a blow upon the initial movement of the stem.

In testimony whereof I have signed my name to this specification in the presence of two subscribing witnesses.

ERNEST G. HOWARD.

Witnesses:
F. A. CUTTER,
DEXTER E. TILLEY.